(12) United States Patent
Hatfield

(10) Patent No.: US 6,318,297 B1
(45) Date of Patent: Nov. 20, 2001

(54) LIVESTOCK FREE STALL AND METHOD FOR MAKING THE SAME

(76) Inventor: John Hatfield, 1823 Shoestring Rd., Gooding, ID (US) 83330

( * ) Notice: Subject to any disclaimer, the term of this patent is extended or adjusted under 35 U.S.C. 154(b) by 0 days.

(21) Appl. No.: 09/491,711

(22) Filed: Jan. 26, 2000

(51) Int. Cl.[7] .................................................. A01K 1/00
(52) U.S. Cl. ........................................................ 119/516
(58) Field of Search .............................. 119/14.03, 520, 119/519, 523, 522, 516

(56) References Cited

U.S. PATENT DOCUMENTS

| | | | |
|---|---|---|---|
| Re. 32,728 | 8/1988 | Albers, Sr. | 119/148 |
| Re. 34,232 | 4/1993 | Da Silveira | 119/148 |
| 1,142,246 * | 6/1915 | Gagan . | |
| 1,910,666 * | 5/1933 | Babson . | |
| 1,996,196 * | 4/1935 | Ferris . | |
| 2,642,037 * | 6/1953 | Merrill . | |
| 3,421,478 * | 1/1969 | Warmerdam . | |
| 3,726,257 * | 4/1973 | Andersen | 119/27 |
| 3,802,392 * | 4/1974 | Andersen | 119/27 |
| 3,986,481 * | 10/1976 | Gloeggler et al. | 119/27 |
| 4,037,566 | 7/1977 | Albers | 119/147 |
| 4,051,813 | 10/1977 | Albers | 119/148 |
| 4,055,149 | 10/1977 | Haiges | 119/147 |
| 4,116,166 | 9/1978 | Gofflot . | |
| 4,185,592 | 1/1980 | Albers, Sr. | 119/148 |
| 4,377,131 | 3/1983 | Vandenberg et al. | 119/148 |
| 4,457,265 | 7/1984 | Anderson | 119/148 |
| 4,476,815 | 10/1984 | Albers, Sr. | 119/147 |
| 4,495,897 | 1/1985 | Albers, Sr. | 119/148 |
| 4,574,741 | 3/1986 | Mahler . | |
| 4,579,084 | 4/1986 | McCan et al. . | |
| 4,599,972 * | 7/1986 | Kilburn | 119/27 |
| 4,867,105 | 9/1989 | Hatfield | 119/148 |
| 4,930,452 | 6/1990 | Da Silveira | 119/148 |
| 4,976,224 | 12/1990 | Hatfield | 119/148 |
| 5,069,163 * | 12/1991 | Moreau et al. | 119/27 |
| 5,109,802 | 5/1992 | Priefert . | |
| 5,111,770 * | 5/1992 | Weelink | 119/27 |
| 5,226,387 | 7/1993 | Anderson | 119/148 |
| 5,289,798 | 3/1994 | Lock | 119/58 |
| 5,309,869 | 5/1994 | Albers, Jr. | 119/735 |
| 5,373,813 | 12/1994 | Da Silveira | 119/740 |
| 5,392,731 | 2/1995 | Hoppman et al. . | |
| 5,564,368 | 10/1996 | Hepp et al. | 119/740 |
| 5,694,887 | 12/1997 | Vandenberg . | |
| 5,967,091 * | 10/1999 | Zartman | 119/522 |
| 6,026,766 * | 2/2000 | Albers, Jr. | 119/520 |

FOREIGN PATENT DOCUMENTS

| | | | |
|---|---|---|---|
| 24 46 026 | 4/1976 | (DE) . | |
| 28 18 513 | 11/1976 | (DE) . | |
| 26 32 057 | 1/1978 | (DE) . | |
| 29 11 431 | 9/1980 | (DE) | A01K/1/06 |
| 2 242 929 | 5/1975 | (FR) . | |
| 2 332 703 | 7/1977 | (FR) . | |
| 646960 | 2/1979 | (RU) | A01K/1/06 |

* cited by examiner

Primary Examiner—Peter M. Poon
Assistant Examiner—Kevin Jakel
(74) Attorney, Agent, or Firm—Frank J. Dykas; Robert L. Shaver; Stephen M. Nipper

(57) ABSTRACT

A livestock free stall is provided, having a pair of vertically oriented posts held in fixed spaced relationship. Each of the posts has attached thereto in parallel spaced relationship upper and lower receiver tubes or posts with the receiver tubes or posts of each stanchion oriented in parallel spaced relationship to the corresponding upper and lower receiver tubes or posts of the other stanchions. A pair of rail loops, each having upper and lower ends, are then configured and sized for insertion into the upper and lower receiver tubes, or for receiving the upper and lower receiver posts, is then attached and fastened to the stanchion. A top rail interconnects the posts to form the completed free stall assembly.

10 Claims, 3 Drawing Sheets

LIVESTOCK FREE STALL AND METHOD FOR MAKING THE SAME

BACKGROUND OF THE INVENTION

1. Technical Field

This invention generally relates to livestock free stalls and more particularly to a livestock free stall and method of assembling the same which reduces onsite fabrication through the use of prefabricated posts and rail loops.

2. Background

Livestock free stalls have been in common usage for many years both for beef and dairy cattle. In particular, in the United States, livestock free stalls are used more commonly with dairy cattle.

The free stalls are installed inside of barns and other types of enclosures. These free stalls are called that because the stalls are freely accessible to the cattle. They are used to keep the cattle oriented so that their posterior ends are aligned uniformly so that manure and urine droppings fall in a designated place where the livestock will not lay in it and it can be conveniently flushed out when the barn is cleaned. Cattle are free to stand or lay down within the stall in a manner where they will not step on or lay on other cattle and thus can be far more easily managed.

The installation of free stalls, in the prior art, usually occurs at the time the barn is being erected. The stanchions or vertical posts are typically presited before the concrete floor is poured. In some installations, bolts to which the vertical posts or stanchions are to be attached are presited when the floor is poured. A top rail is installed interconnecting the tops of stanchions or posts and side rails are typically welded to the posts to create the stalls. This type of installation is not amendable to prefabrication of the parts that will eventually make up the free stall assemblies since it is difficult to accurately place the vertical posts or stanchions. As a result, prior art free stalls are typically the result of custom pipe fitting which is accomplished on the job site. This is slow, tedious and expensive work to perform requiring skilled labor, oftentimes located at a remote site.

Accordingly, what is needed is a new design for free stalls which is amendable to prefabrication using standardized tooling and jigs at a shop, followed by quick and simple assembly in the field. Also what is needed is a design for free stalls while where the dimensional tolerances between the vertical posts or stanchions as they are set in the concrete floor, is not critical to assembling of the free stalls.

DISCLOSURE OF INVENTION

These objects are achieved by use of a method wherein a plurality of stanchions or concrete posts are preset at the time the concrete floor of the barn is poured or, if the concrete floor has already hardened, bolts are set and the stanchions are fixed to the floor. Attached to the concrete posts or stanchions are a plurality of upper receiver tubes and lower receiver tubes which are oriented and fixed making a parallel spaced relationship vertically, one to the upper and lower, and horizontally to the corresponding upper and lower tubes of each of the stanchion posts.

A prefabricated rail loop having upper end and lower end adapted to be received within the corresponding upper and lower receiver tubes of the stanchion posts are then inserted into the receiver tubes and attached by means of a bolt or other fastener. A top rail is then used to interconnect the tops of each of the stanchions or posts to complete the free stall assembly.

Neck rails are then attached to the upper portion of the rail loops at a position designed to position the livestock appropriately within the free stall. A briquette rail is then attached to the lower portion of the rail at a position designed to contact the briquette of an animal laying down so as to position the animal correctly within the free stall.

Both the stanchion posts and the rail loops are prefabricated at a remote location, thus minimizing onsite time and effort for fabrication.

BEST MODE FOR CARRYING OUT INVENTION

Figure 1:
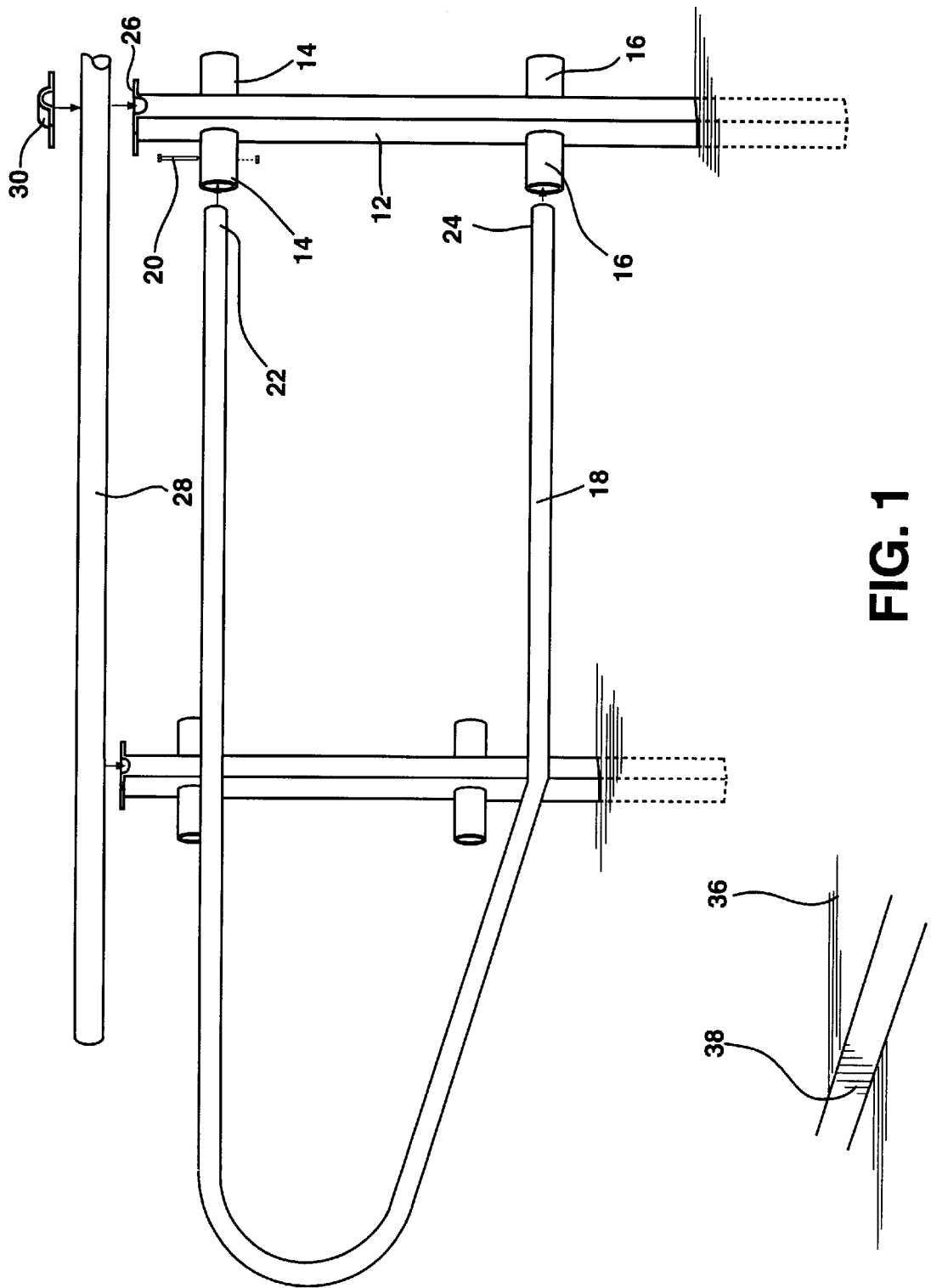
FIG. 1 is an exploded representational view of a section of a free stall.
Figure 2:
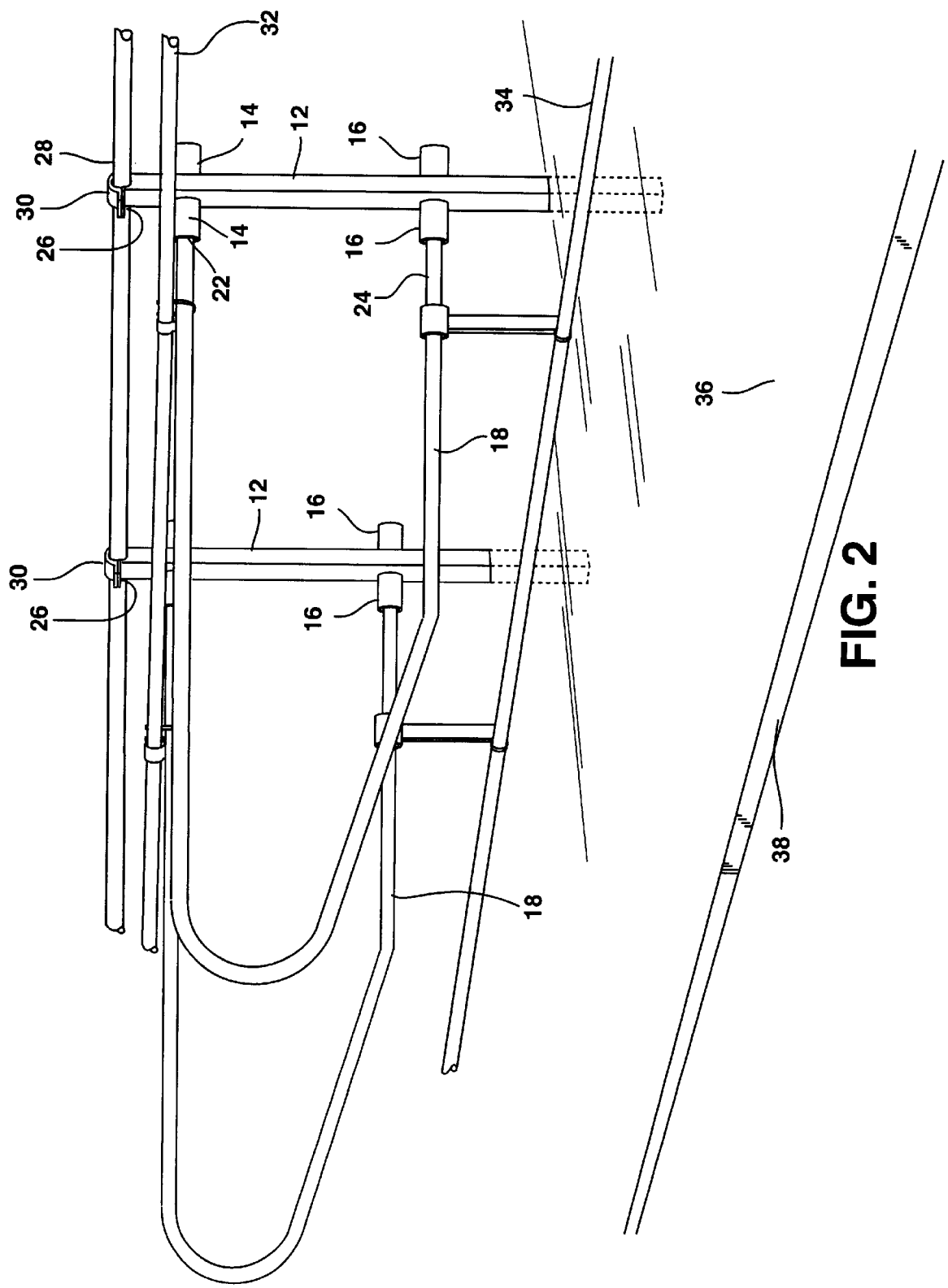
FIG. 2 is a representational prospective view of a completed free stall.
Figure 3:
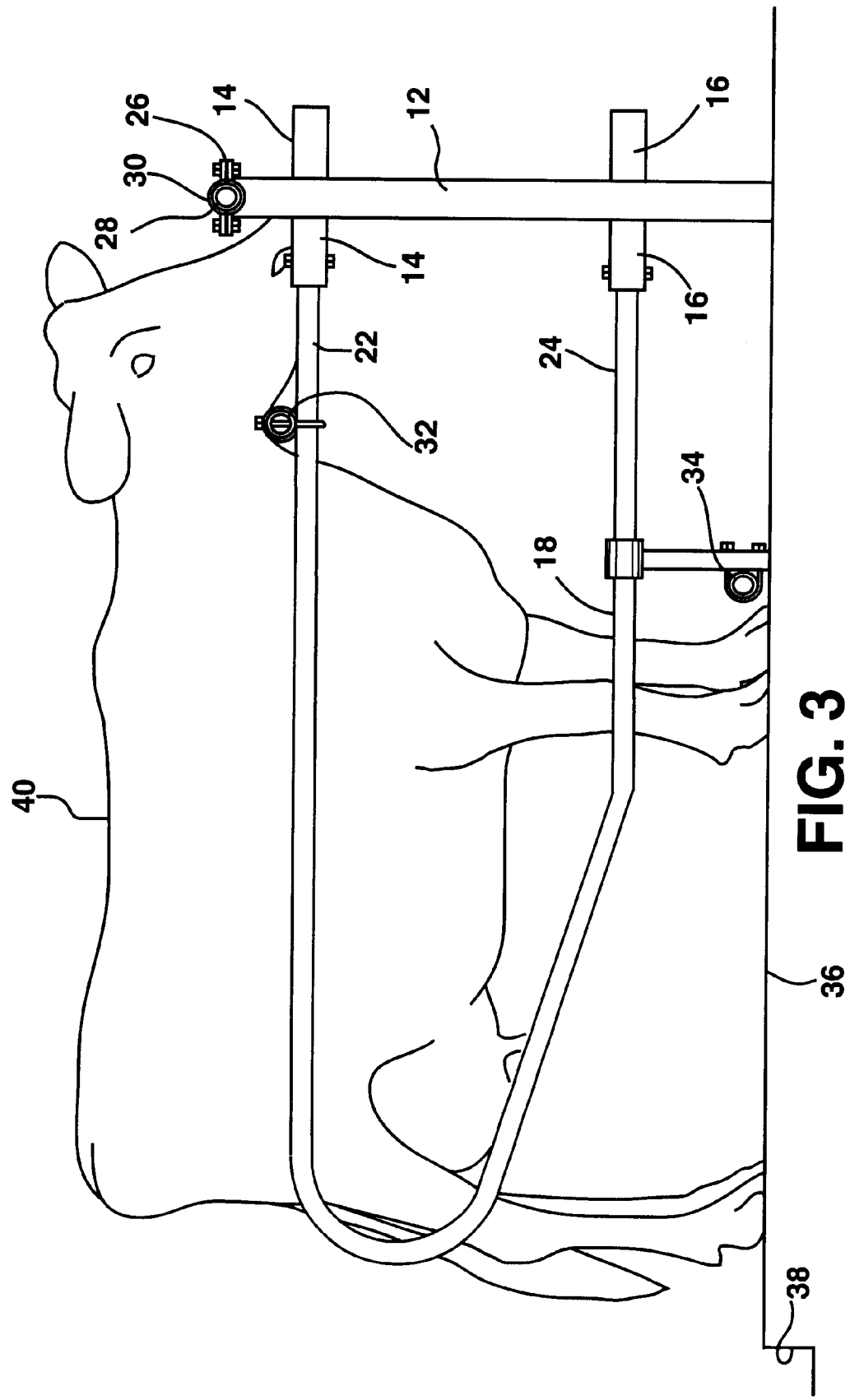
FIG. 3 is a side view of a free stall occupied by a cow.

Referring to FIGS. 1, 2 and 3, there is shown the new design for a free stall which reduces the amount of onsite custom fabrication that has to be done to install the free stall assemblies.

As shown in FIG. 3, there is a side view of a section of a free stall showing cow 40 occupying the stall in a standing position. At the time that the concrete floor 36 of the barn was poured, there were presited a plurality of stanchions or concrete posts 12, which in the preferred design are 2-inch box steel posts which are set directly in the concrete at the time of pouring. Attached to posts 12 are two sets of upper receiver tubes 14 and lower receiver tubes 16 which are oriented as is shown in FIGS. 1 and 2. The reason for two sets, is that in the preferred embodiment a mirror image set of free stalls are assembled on the other side of posts 12 to the ones shown in the drawings. They are not shown in the drawings but it should be readily apparent to those skilled in the art that two sets of mirror image free stalls can be assembled off of one line of posts 12. It should be equally apparent to those skilled in the art that if it is not desired to create mirror image free stalls, then only one set of upper receiving tube 14 and lower receiving tube 16 are required.

Rail loop 18 having upper end 22 and lower end 24 is also provided and is typically prefabricated at a remote location such as a metal working shop. Rail loop 18 is configured such that upper end 22 and lower end 24 can be readily and easily inserted into upper and lower receiver tubes 14 and 16 and pinned using bolt 20 as is shown in FIG. 1. Top rail 28 is next laid atop top rail bracket 26 and it together with top rail clamp 30 are bolted together to complete the assembly.

As shown in FIGS. 2 and 3, neck rail 32 is also attached to the upper portion of rail loop 18, and briquette rail 34 is attached by conventional brackets to the lower end of rail loop 18. The neck rail 32 and briquette rail 34 add structural rigidity to the rail loops in addition to serving the very useful function of positioning the animal so that its posterior end located in the vicinity of waste trough 38 of concrete floor 36 so that manure and urine can be readily collected and flushed from the barn.

While it is shown in the preferred embodiment that the use of receiver tubes 14 and 16 is the preferred embodiment, it should be apparent to one skilled in the art that they could just as easily be receiver posts which are inserted into the upper and lower ends of rail loop 18.

It should be apparent to those skilled in the art that the use of continuous rail loops 18 with either receiver tubes or receiving posts eliminates the need for close dimensional tolerances, especially for the distances between vertical posts or stanchions 12. In this manner, once the vertical posts or stanchions 12 have been set or fixed to the floor of the barn, all the rest of the rails can be quickly and easily prefabricated at a remote location and installed in a manner of minutes as opposed to many hours.

While there is shown and described the present preferred embodiment of the invention, it is to be distinctly understood that this invention is not limited thereto but may be variously embodied to practice within the scope of the following claims.

I claim:

1. A livestock stall freely accessible to livestock, which comprises:
   a pair of vertically oriented posts held in fixed juxtaposed, spaced, relationship, with each of said posts having attached thereto, in parallel spaced relationship, upper and lower receiver tubes, with said upper and lower receiver tubes of each post oriented in parallel spaced relationship to the corresponding upper and lower receiver tubes of the other post;
   a pair of rail loops, each having upper and lower ends, said ends held in parallel space relationship to each other and configured for insertion of said upper and lower ends into the upper and lower receiver tubes of one of said posts;
   means for fastening at least one end of each of said rail loops to said posts; and
   a top rail interconnecting said posts.

2. The livestock stall of claim 1 which further comprises a neck rail attached to and interconnecting the upper portion of said rail loops at a position to engage the neck of said livestock when it enters said livestock stall.

3. A livestock stall freely accessible to livestock, which comprises:
   a pair of vertically oriented posts held in fixed juxtaposed, spaced, relationship, with each of said posts having fixedly attached thereto, in parallel spaced relationship, upper and lower receiver tubes, with said upper and lower receiver tubes of each post oriented in parallel spaced relationship to the corresponding upper and lower receiver tubes of the other post;
   a pair of rail loops, each having upper and lower ends, said ends held in parallel space relationship to each other and configured for insertion of said upper and lower ends into the upper and lower receiver tubes of one of said posts;
   means for fastening at least one end of each of said rail loops to said posts;
   a top rail interconnecting said posts;
   a neck rail attached to and interconnecting the upper portion of said rail loops at a position to engage the neck of said livestock when it enters said livestock stall; and
   a briquette rail attached to and interconnecting the lower portion of said rail loops at a position to engage the neck of said livestock when it lays down in said livestock stall.

4. A livestock stall freely accessible to livestock, which comprises:
   a pair of vertically oriented posts held in fixed juxtaposed, spaced, relationship, with each of said posts having fixedly attached thereto, in parallel spaced relationship, upper and lower receiver tubes, with said upper and lower receiver tubes of each post oriented in parallel spaced relationship to the corresponding upper and lower receiver tubes of the other post;
   a pair of rail loops, each having upper and lower ends, said ends held in parallel space relationship to each other and configured for insertion of said upper and lower ends into the upper and lower receiver tubes of one of said posts;
   means for fastening at least one end of each of said rail loops to said posts;
   a top rail interconnecting said posts; and
   a briquette rail attached to and interconnecting the lower portion of said rail loops at a position to engage the neck of said livesock when it lays down in said livestock stall.

5. A livestock stall freely accessible to livestock, which comprises:
   a pair of vertically oriented stanchions held in fixed juxtaposed, spaced, relationship, with each of said stanchions having fixedly attached thereto, in parallel spaced relationship, upper and lower receiver posts, with said upper and lower receiver posts of each post oriented in parallel spaced relationship to the corresponding upper and lower receiver tubes of the other stanchion;
   a pair of rail loops, each having upper and lower ends, said ends held in parallel space relationship to each other and configured for receiving said upper and lower posts of one of said stanchions;
   means for fastening at least one end of each of said rail loops to said posts; and
   a top rail interconnecting said stanchions.

6. The livestock stall of claim 5 which further comprises a neck rail attached to and interconnecting the upper portion of said rail loops at a position to engage the neck of said livestock when it enters said livestock stall.

7. A livestock stall freely accessible to livestock, which comprises:
   a pair of vertically oriented stanchions held in fixed juxtaposed, spaced, relationship, with each of said stanchions having fixedly attached thereto, in parallel spaced relationship, upper and lower receiver posts, with said upper and lower receiver posts of each post oriented in parallel spaced relationship to the corresponding upper and lower receiver tubes of the other stanchion;
   a pair of rail loops, each having upper and lower ends, said ends held in parallel space relationship to each other and configured for receiving said upper and lower posts of one of said stanchions;
   means for fastening at least one end of each of said rail loops to said posts;
   a top rail interconnecting said stanchions;
   a neck rail attached to and interconnecting the upper portion of said rail loops at a position to engage the neck of said livestock when it enters said livestock stall; and
   a briquette rail attached to and interconnecting the lower portion of said rail loops at a position to engage the neck of said livestock when it lays down in said livestock stall.

8. A livestock stall freely accessible to livestock, which comprises:
   a pair of vertically oriented stanchions held in fixed juxtaposed, spaced, relationship, with each of said stanchions having fixedly attached thereto, in parallel spaced relationship, upper and lower receiver posts, with said upper and lower receiver posts of each post oriented in parallel spaced relationship to the corresponding upper and lower receiver tubes of the other stanchion;

a pair of rail loops, each having upper and lower ends, said ends held in parallel space relationship to each other and configured for receiving said upper and lower posts of one of said stanchions;

means for fastening at least one end of each of said rail loops to said posts; a briquette rail attached to and interconnecting the lower portion of said rail loops at a position to engage the neck of said livestock when it lays down in said livestock stall.

9. A method for assembling a livestock stall freely accessible to livestock, in a barn having a floor, which comprises:

fixing a pair of vertically oriented posts to said floor in juxtaposed, spaced, relationship, with each of said posts having fixedly attached thereto, in parallel spaced relationship, upper and lower receiver tubes, with said upper and lower receiver tubes of each post oriented in parallel spaced relationship to the corresponding upper and lower receiver tubes of the other post;

inserting a pair of rail loops, each having upper and lower ends, said ends held in parallel space relationship to each other and configured for insertion of said upper and lower ends into the upper and lower receiver tubes of one of said posts;

fastening at least one end of each of said rail loops to said posts; and installing a top rail interconnecting said posts.

10. A method of assembling a livestock stall freely accessible to livestock, in a barn having a floor, which comprises:

fixing a pair of vertically oriented stanchions to said floor in juxtaposed, spaced, relationship, with each of said stanchions having fixedly attached thereto, in parallel spaced relationship, upper and lower receiver posts, with said upper and lower receiver posts of each post oriented in parallel spaced relationship to the corresponding upper and lower receiver tubes of the other stanchion;

attaching a pair of rail loops, each having upper and lower ends, said ends held in parallel space relationship to each other and configured for receiving said upper and lower posts of one of said stanchions to said posts, fastening at least one end of each of said rail loops to said posts; and installing a top rail interconnecting said stanchions.

* * * * *